United States Patent Office 3,154,506
Patented Oct. 27, 1964

3,154,506
POLYTETRAFLUOROETHYLENE-WATER INSOLUBLE CELLULOSIC ESTER DISPERSIONS AND METHOD OF FORMING COATINGS THEREWITH
Walter D. Janssens, Port Huron, Mich., assignor to Acheson Industries, Inc., Port Huron, Mich., a corporation of Michigan
No Drawing. Filed Sept. 8, 1958, Ser. No. 759,399
12 Claims. (Cl. 260—17)

This invention relates to polytetrafluoroethylene dispersions which are suitable for the formation of protective and dry film lubricant coatings on various substrate surfaces, concentrates thereof, the method of forming such coatings and the articles produced thereby. More particularly this invention relates to an improved polytetrafluoroethylene dispersion which is capable of being applied to substrate surfaces and of forming an adherent film thereon having uniformly distributed polytetrafluoroethylene particles therein without the application of heat to cure the coating.

The primary object of this invention is to provide a dispersion of finely divided polytetrafluoroethylene particles which is improved in the respect that it can be applied to a substrate surface and dried thereon at ordinary atmospheric ambient, or room temperatures.

A further object of this invention is to provide a method of forming protective and dry film lubricant coatings on a variety of substrate surfaces which contain uniformly distributed polytetrafluoroethylene particles as a discontinuous phase in a continuous phase film of the air drying type.

Another important object of this invention is to provide polytetrafluoroethylene cellulose ester resin concentrates which are stable, capable of being transported, and which are suitable for forming the improved dispersions of this invention by dilution.

Dispersions which are capable of accomplishing the above objects comprise finely divided polytetrafluoroethylene particles, a cellulose ester and a dispersing medium, preferably an admixture of water and an organic solvent for the selected cellulose ester. As applied to the surface the dispersions are relatively dilute and can be formulated from single package concentrates by the addition of appropriate organic solvents. The cellulose ester is present in sufficient quantity to act as the continuous phase for securing the polytetrafluoroethylene particles to a substrate surface and the polytetrafluoroethylene particles constitute a uniformly distributed discontinuous phase therein. By the expression "relatively dilute dispersion" is meant that the total quantity of polytetrafluoroethylene and cellulose ester resin solids is a relatively minor quantity which for the specifically useful esters of this invention does not exceed 35% by weight of the dispersion. The specific esters which are useful in accordance with this invention have, in fact, different maximum total solids concentrations in dispersions to enable successful application of uniform coatings, and these concentrations will be discussed in detail hereinafter. When the specific maximum concentrations are present in the dispersions, it has been found that the dispersions when applied to substrate surfaces by brushing, dipping or spraying, produce adherent films in which the polytetrafluoroethylene particles are uniformly distributed by merely applying the dispersion to the surface and allowing it to dry at ambient, or normal room temperatures. The substrates may include metals, rubber, leather, glass, plastics, wood, cork, etc., and when so applied to said surfaces the resultant film is characterized by lubricating, parting and surface protecting properties comparable to those which characterize a fused solid film of polytetrafluoroethylene of similar thickness.

Polytetrafluoroethylene particles which are suitable for use in the dispersions of this invention are those which have been condensed or pluralized to an extent such that they are normally solid and are dispersible in a liquid medium of water or an organic suspending agent such as hydrocarbons, alcohols, esters, ketones, etc. and which have a particle size of about 0.1 to about 3 microns, the predominant portion having a size of about 1 micron. It is preferred to employ an aqueous suspension of colloidal polytetrafluoroethylene as the source of the polytetrafluoroethylene particles. Suitable starting materials of this type include an aqueous suspension containing 60% polytetrafluoroethylene particles having a size in the range of about 0.1 to about 3 microns, available under the trade name Teflon 30, and an aqueous suspension containing about 40% polytetrafluoroethylene particles of comparable size and available under the trade name Teflon 41X.

The cellulose esters which serve as the continuous phase-producing ingredient of the dispersions of this invention include cellulose acetate, cellulose acetate butyrate, cellulose acetate propionate, cellulose triacetate, cellulose propionate and nitrocellulose. Of these esters nitrocellulose has been found to be highly satisfactory and is preferred. Mixtures of such cellulose esters can be used, if desired, and mixtures are desirable in certain instances to obtain particular properties in the continuous phase portion of the coating.

It has been found that the specific cellulose ester resins of this invention require separate and distinct organic solvents, in conjunction with the water introduced together with the polytetrafluoroethylene particles, to form satisfactorily stable dispersions. For cellulose acetate, suitable solvents include acetone, diacetone, cyclohexanone, methyl acetate, ethyl lactate, etc. For cellulose acetate butyrate, typically suitable solvents include methylethyl ketone, methyl isobutyl ketone, acetone, etc. For cellulose acetate propionate, typically suitable solvents include acetone, dioxane, methylene chloride, cyclohexanone, methyl acetate, etc. For cellulose triacetate, typically suitable solvents include dioxane, methylene chloride, nitropropane, chloroform and mixtures of ethylene chloride and methyl alcohol, etc. For cellulose propionate typically suitable solvents include butyl acetate, ethyl acetate, tetrahydrofurane, etc. For nitrocellulose, typically suitable solvents include methyl isobutyl ketone, butyl acetate, ethyl acetate, amyl acetate, etc. If desired, common diluents such as toluene, xylene, heptane, mineral spirits, ethyl alcohol and butyl alcohol can be used in conjunction with the above named solvents by employing combination diluent-solvent systems now well known to those skilled in this art. The dispersions are formed by preliminarily dissolving the cellulose ester, modifying resins and dispersing agents, which may be optionally included, in the solvent selected for the cellulose ester and thereafter blending in the polytetrafluoroethylene particles, as finely divided powder or in the form of an aqueous dispersion as above described.

As above indicated, the total polytetrafluoroethylene and the cellulose ester solids must be restricted and varies with the particular cellulose ester which is present. In dispersions which are in a form to be directly applied to the substrate surface, the maximum quantity of the specific cellulose esters which gives the greatest ease in application and the most uniformly adherent coatings are as follows:

| | Maximum total solids including polytetrafluoroethylene solids |
|---|---|
| Cellulose acetate | About 25%. |
| Cellulose acetate butyrate | About 35%. |
| Cellulose acetate propionate | About 8%. |
| Cellulose triacetate | About 15%. |
| Cellulose propionate | About 20%. |
| Nitrocellulose | About 30%. |

Of these total solids, the polytetrafluoroethylene solids may satisfactorily constitute between about 10% and about 80% by weight. When the polytetrafluoroethylene particles comprise less than about 10% by weight of the combined cellulose ester and polytetrafluoroethylene solids the lubricity and wear life characteristics of the coatings are somewhat inferior. When the proportion of polytetrafluoroethylene particles is in excess of about 80% by weight of the total solids, there is an increased tendency for agglomeration of the polytetrafluoroethylene particles on the surface and a tendency toward decreased adherence of the coating to the substrate surface. Best results have been obtained when the polytetrafluoroethylene comprised between about 40% and about 60% of the total solids present. In all cases it is preferred to employ dispersions which are more dilute in total solids than the above indicated maximums, but it will be appreciated that the formation of a desired coating thickness will require the application of an increased number of layers as the dispersions become more dilute. Suitable coatings are formed, however, with relatively dilute solutions containing, for example, about ½ to 2% total solids by weight of the dispersion.

The above described dispersions are relatively stable and remain in the form of sufficiently uniform dispersions for times greatly in excess of that necessary in the commercial application of such dispersions to substrate surfaces. It has been found, however, that the stability of the dispersions is improved by the incorporation therein of 0%–15% by weight of said cellulose ester solids, of polyvinylbutyral, polyvinyl formal and cellulose ether resins such as ethyl cellulose and ethylhydroxyethyl cellulose. About 5% to about 15% by weight of such a stability promoting resinous material, based on the weight of the cellulose ester solids, is preferred. Although it is unnecessary for utility, the dispersions may also include a compatible wetting agent for improving both the stability of the dispersion and the spreadability of the dispersion on the substrate surface as it is applied. Cationic, non-ionic and anionic types of wetting agents have been found to be suitable and examples of such wetting agents for this purpose include sodium di-alkyl sulfosuccinates such as are available under the trade name Aerosol OT, a lyoxyethylene lauryl ether such as is available under the trade name Brij 35 and stearyl dimethyl benzyl ammonium chloride such as is available under the trade name Triton X-400. These wetting agents may be used in a proportion of about 0.1 to about 2% by weight of the dispersion to be applied to a surface, or as high as 10% in a concentrated mixture, described more in detail hereinbelow.

The dispersions of this invention may be applied to the substrate to be coated by brushing, dipping or spraying at room temperatures, or at elevated temperatures conventional in the application of lacquers. The materials which can be satisfactorily coated include metal, plastics, paper glass, wood, leather, rubber, cork and the like. The adhesion of the coating is enhanced, in general, by preliminarily roughening the surface such as by mechanical abrasion or by grit blasting, and where the substrate is metal a preferred method is the use of conventional surface conditioning treatments to prepare the metal to receive a siccative coating by the formation thereon of a coating of a metallic phosphate, oxalate, oxide or sulfide or a mixture thereof, acid etching, chromate coating and the like. The coatings of this invention are applied in relatively thin layers over such preliminary underlayers and even where a relatively thick total coating is desired the coating is preferably built up by applying a thin layer and allowing it to dry or tackify and then covering it with another thin layer, etc. By this procedure, coatings having a thickness as high as about 10 mils can be easily prepared and the benefits of this invention of improved lubricity, corrosion resistance and non-wettability are obtained when the coatings have a thickness in the range of about 0.1 to about 10 mils. For most purposes a coating having a thickness in the range of about 0.3 to about 0.8 mil is satisfactory and is preferred to the relatively thicker coatings which in some applications have a greater tendency to flake and spall during use.

Concentrates or materials containing higher quantities of total solids than those above indicated for preferred use for direct application to the surface to be coated can be formed by preliminarily dissolving large quantities of the cellulose ester in its solvent and thereafter slowly and carefully blending into the cellulose ester solution a proportion of polytetrafluoroethylene to produce the desired solids concentration, preferably in the presence of a dispersing agent such as polyvinyl butyral or a wetting agent of the above described type. It has been found that concentrates containing substantially higher total solids than can be applied to form coatings directly, can nevertheless be formed and are sufficiently stable to be handled as a single package material and transported from a point of formation by ordinary transportation means to the intended point of application without agglomerating to a detrimental extent. They can be converted into solutions for direct application by merely adding additional quantities of the appropriate solvent. In general, it has been found that higher total solids concentrates can be formed when the proportion of polytetrafluoroethylene exceeds the proportion of the cellulose ester, and particularly where the proportion of polytetrafluoroethylene approaches 80% of the total. It has been further found, however, that each of the cellulose esters of this invention has, in conjunction with polytetrafluoroethylene particles its own maximum total solids limit, as follows. The cellulose acetate polytetrafluoroethylene concentrate may contain maximum total solids of 35% and a maximum cellulose acetate solids of 20%. As the proportion of cellulose acetate solids is increased the relative quantity of polytetrafluoroethylene particles which is present in the concentrate is correspondingly reduced to allow the cellulose acetate solids to reach 80% of the total solids and when these proportions prevail, the maximum total solids is 7.5%. In like manner, the cellulose acetate butyrate-polytetrafluoroethylene concentrate may have a total solids of 45%, and a maximum cellulose acetate butyrate solids of 36%, a maximum polytetrafluoroethylene solids of 36%. In this case, as the proportion of cellulose acetate butyrate solids increases and the polytetrafluoroethylene particles decrease in concentration, the total solids will vary in accordance with the solubility limit of cellulose acetate butyrate in the selected solvent system. Similarly, the cellulose acetate propionate-polytetrafluoroethylene concentrate may have a maximum total solids of 30%, a maximum cellulose acetate propionate solids of 10% and a maximum polytetrafluoroethylene solids content of 24% and these limits also apply to cellulose propionate-polytetrafluoroethylene concentrates; the cellulose triacetate-polytetrafluoroethylene concentrate may have a total solids of 26%, a maximum cellulose triacetate solids of 12% and a maximum polytetrafluoroethylene solids of 21%; the nitrocellulose-polytetrafluoroethylene concentrate may have a maximum total solids of 45%, a maximum nitrocellulose solids of 30% and a maximum polytetrafluoroethylene solids content of 35%.

The dispersions of this invention may also satisfactorily contain other low friction characteristic pigments such as graphite, molybdenum disulfide, boron nitride, talc, vermiculite, tungsten disulfide, silver sulfate and yellow lead oxide, so long as the quantity of such other pigment in the dispersion is less than the quantity of polytetrafluoroethylene particles which are present, and the quantity is preferably kept to a small proportion of the polytetrafluoroethylene particles, for example, 10%–30% thereof. The dispersions may also contain compatible dyes to confer upon the dispersion the desired color, and examples of suitably compatible dyes are methylene blue and methyl violet.

It is apparent that the presence of a film-forming carrier for the polytetrafluoroethylene particles, which is capable of drying at ambient temperatures, avoids many of the disadvantages which previously characterized the attempts to position adherent polytetrafluoroethylene on the surface of other materials. The dispersions of this invention makes it feasible to apply polytetrafluoroethylene to substrate materials incapable of withstanding the heating required to fuse polytetrafluoroethylene or to cure other resin films which serve to secure such particles to a surface. The coatings which result from the use of the dispersions of this invention, as above described are characterized by coefficients of friction approaching those that are characteristic of coatings which result from the heat-fusing of polytetrafluoroethylene, and have good wear life under load as well as excellent characteristics as parting compounds.

The dispersions and the method of this invention are illustrated in greater detail in the specific typical and illustrative examples which follow, and in these examples, the ½ second nitrocellulose is 65% nitrocellulose solids in ethyl alcohol.

EXAMPLE I

A dispersion was prepared by first dissolving 43 parts of ½ second nitrocellulose, the ½ second viscosity being determined by ASTM standard method D301–50 modified to 20% concentration, in 140 parts butyl acetate, 90 parts ethyl acetate (85%–88%), 11 parts isopropanol and 76 parts toluene by stirring. 50 parts of Teflon 30, an aqueous suspension containing 60% polytetrafluoroethylene having an average particle size of about 1 micron, was blended into the nitrocellulose solution to thus form a uniform dispersion. The dispersion was placed in the receptacle of a DeVilbiss spray gun, Model MBC with a No. 30 tip and was sprayed on a plurality of 4" x 6" clean low carbon steel panels using an air pressure between 25 and 50 p.s.i., a nozzle distance from the panel between 12" and 20" and employing from 6–10 passes. The coated surfaces were allowed to dry and upon inspection were found to have thicknesses in the range of 0.1 to 0.4 mil, to be adherent and to have polytetrafluoroethylene particles relatively uniformly distributed over the panel surfaces. The panels were tested for coefficient of static friction and found to have an average coefficient of 0.075. The wear resistance of the coating was established on another plurality of samples in the form of bearing races, the entire surface of which was coated in a similar fashion to that set forth above for the panel surfaces. The coatings were tested on a Hartmann Tester by loading the lever arm with a 5 pound load and running the test to failure as indicated by an increase in temperature to 180° F. The bearing races so coated were found to have a wear life of 83 minutes.

EXAMPLE II

A dispersion was prepared by dissolving 160 parts ½ second nitrocellulose in 320 parts toluene, 40 parts isopropanol, 360 parts ethyl acetate, 535 butyl acetate and 116 parts butanol and adding thereto 24 parts of polyvinylbutyraldehyde and stirring until uniform. 260 parts of Teflon 30 was then slowly blended into the nitrocellulose solution to form a uniform dispersion. The dispersion was sprayed on a plurality of 4" x 6" clean low carbon steel panels using the same apparatus and conditions as above specified in Example I and the panels were allowed to dry. The coatings on the panels were smooth and adherent, had a coefficient of static friction averaging 0.087. A plurality of bearing races coated in a similar manner and having an average coating thickness of 0.35 mil were tested for wear life under the conditions specified in Example I and found to have a wear life of 134 minutes.

EXAMPLE III

A solution was prepared by dissolving 10.3 parts of ½ second nitrocellulose and 1.5 parts of polyvinyl butyraldehyde in 7.5 parts of butyl alcohol, 34.3 parts of butyl acetate, 23.2 parts of ethyl acetate (85%–88%), 2.6 parts of isopropyl alcohol, and 20.6 parts of toluene and stirring until uniform. A solvent solution was then prepared by blending together 3.4 parts of butyl alcohol, 15.6 parts of butyl acetate, 10.5 parts of ethyl acetate (85%–88%), 1.1 parts of isopropyl alcohol, and 9.4 parts of toluene. An aqueous dispersion was prepared by blending together 1.8 parts of Poly-Tex 611–B and 20.2 parts of Teflon 30. Poly-Tex 611–B is a 60% solids aqueous suspension of a soya oil modified epoxy containing phenolic ether resin, which resin prior to esterification, had a 1,2 epoxy equivalency greater than 1 and is available from the Jones-Dabney Company. One hundred parts of the nitrocellulose solution and 22 parts of the Poly-Tex 611–B plus Teflon 30 dispersion as prepared above were admixed and stirred until a uniform dispersion was obtained. This product as formed is suitable for brush and dip application and under certain conditions may be sprayed. For best spray application, however, this product was further reduced with 40 parts of the solvent solution prepared above. After blending, this reduced dispersion has the composition given in Table I.

Table I

| | Percent |
|---|---|
| ½ second nitrocellulose | 6.4 |
| Polyvinyl butyral | 0.9 |
| Butyl alcohol | 6.9 |
| Butyl acetate | 30.7 |
| Ethyl acetate (85%–88%) | 20.8 |
| Isopropyl alcohol | 2.3 |
| Toluene | 18.5 |
| Poly-Tex 611–B | 1.1 |
| Teflon 30 | 12.4 |

This dispersion was placed in the apparatus described in Example I and sprayed on a plurality of 4" x 6" low carbon steel panels in the same manner described in Example I and the coatings were allowed to dry at room temperature. The static coefficient of friction of the coatings on these panels was measured and found to be an average of 0.060. The coatings, as dried, had a pencil hardness of H and after 1 hour at 180° F. had a pencil hardness of B. The coatings were tested for wear life on the Hartmann Tester, in accordance with the conditions specified above in Example I, and the average wear life was found to be 137 minutes.

EXAMPLE IV

A solution was prepared by dissolving 46.7 parts of ½ second nitrocellulose and 3.3 parts of a polyvinyl butyral resin in 102 parts of a solution comprising 8.6 parts of butyl alcohol, 39.8 parts of butyl acetate, 26.8 parts of ethyl acetate, 3.0 parts of isopropyl alcohol and 23.8 parts of toluene. Into this solution was admixed by stirring, 224 parts of Teflon 30. The resulting dispersion is homogeneous and very thick and viscous and has a total solids of 45%. In this state it is easily transportable and at the point of use easily thinned to a usable viscosity. In testing this product 25 parts of it was reduced with 75 parts of the solvent blend set forth above in Example III.

A plurality of 4" x 6" low carbon steel panels were spray coated with the dispersion by employing the apparatus under the same conditions employed in Example I. After drying, the panels were inspected and found to be coated with an adherent coating having uniformly distributed polytetrafluoroethylene particles therein. The static coefficient of friction was measured and found to be an average of .096. The coatings were tested for wear life in the same manner and on the apparatus previously described in Example I and found to be an average of 75 minutes.

EXAMPLE V

A solution was prepared by dissolving 50.0 parts of ½ second nitrocellulose in 50 parts of a solution comprising 4.2 parts of butyl alcohol, 19.5 parts of butyl acetate, 13.1 parts of ethyl acetate, 1.5 parts of isopropyl alcohol, and 11.7 parts of toluene. Into this solution was admixed by stirring 13 parts of Teflon 30. The resulting dispersion is thick, viscous, and homogeneous and has a total solids of 36%.

A plurality of 4" x 6" low carbon steel panels were spray coated with the dispersion, 1 part of which had been reduced with 3 parts of a solvent blend comprising the solvent blend used as a diluent in Example III, by employing the same apparatus and using the conditions cited in Example I. After drying, the panels were inspected and found to be coated with an adherent coating having uniformly distributed polytetrafluoroethylene particles therein. The static coefficient of friction was measured and found to be an average of .079. The coatings were tested for wear life in the same manner and on the apparatus previously described in Example I and found to be an average of 53 minutes.

EXAMPLE VI

A solution was prepared by dissolving 15.9 parts of 5–6 second nitrocellulose in a solution comprising 8.4 parts of butyl alcohol, 39 parts of butyl acetate, 44.4 parts of ethyl acetate (85%–88%), 2.9 parts of isopropyl alcohol, 50.7 parts of toluene, and 5.7 parts of ethyl alcohol. The 5–6 second viscosity was determined by ASTM standard method D301–50. Into this nitrocellulose solution was blended an aqueous dispersion comprising 15.5 parts of Teflon 30 and 1.5 parts of Poly-Tex 611–B. The dispersion which has a total solids of 11% was sprayed on a plurality of 4" x 6" clean low carbon steel panels using the same apparatus and conditions as above specified in Example I and the panels were allowed to dry. The coatings on the panels were smooth, adherent, and had a static coefficient of friction of 0.079. Single race Hartmann wear life is 161 minutes for a film of 0.00015".

EXAMPLE VII

A dispersion was prepared by dissolving 40 parts of ½ second cellulose acetate butyrate, the viscosity of which is determined as prescribed by ASTM method D871–48; and 2.4 parts of polyvinyl formal in 60 parts of acetone. Into this solution was admixed with stirring, 34 parts of Teflon 30. The resulting dispersion is homogeneous, thick, and viscous and has a total solids of 46%.

A plurality of 4" x 6" low carbon steel panels were spray coated with the dispersion, 1 part of which had been reduced with 3 parts of the solvent blend used as a diluent in Example III, by employing the same apparatus and using the conditions cited in Example I. After drying the panels were inspected and found to be coated with an adherent coating having uniformly distributed polytetrafluoroethylene particles therein. The static coefficient of friction was measured and found to be an average of .096. The coatings were tested for wear life in the same manner and on the apparatus previously described in Example I and found to be an average of 41 minutes.

EXAMPLE VIII

A solution was prepared by dissolving 14.5 parts of cellulose acetate, having a viscosity of 39 centipoises when measured as a 10% solution in acetone, in a solution comprised of 85.5 parts of cyclohexanone, 30 parts of toluene, 25 parts of ethyl alcohol, 30 parts of isobutyl acetate, and 15 parts of diethyleneglycol monomethyl ether. Into this solution was slowly blended 24 parts of Teflon 30 to form a uniform dispersion having a total solids of 13%.

A plurality of 4" x 6" low carbon steel panels were spray coated with the dispersion, 2 parts of which had been reduced with 1 part each of methyl alcohol and ethyl acetate, by employing the same apparatus and using the conditions cited in Example I. After drying, the panels were inspected and found to be coated with an adherent coating having uniformly distributed polytetrafluoroethylene particles therein. The static coefficient of friction was measured and found to be an average of .087. The coatings were tested for wear life in the same manner and on the apparatus previously described in Example I and found to be an average of 147 minutes.

EXAMPLE IX

A dispersion was prepared by dissolving 5 parts of cellulose triacetate, Eastman A–432–200 having a viscosity of 1–3 seconds as determined by ASTM method D871–46T, in 35 parts of dioxane, 5 parts of toluol, 10 parts of butanol, and 235 parts of chloroform. Into this solution was slowly blended 6 parts of Teflon 30 to form a uniform dispersion having a total solids of 3%.

A plurality of 4" x 6" low carbon steel panels were spray coated with this dispersion using the apparatus and conditions of application as above set forth in Example I and the coatings allowed to dry in air. An inspection of the coatings revealed that the surfaces were coated with an adherent film having uniformly dispersing therein small polytetrafluoroethylene agglomerants. The coefficient of friction was determined to be an average of 0.114. The coated surfaces when tested for wear life with the Hartmann Tester showed an average wear life of 15 minutes.

EXAMPLE X

A solution was prepared by dissolving 1.5 parts polyvinyl butyral and 10.3 parts of ½ second nitrocellulose in 7.5 parts butyl alcohol, 34.3 parts butyl acetate, 23.2 parts ethyl acetate (85%–88%), 2.6 parts isopropyl alcohol, and 20.6 parts of toluene.

A dispersion was prepared by blending 1.8 parts of Poly-Tex 611–B and 20.2 parts of Teflon 30.

A second dispersion was prepared by dissolving 0.5 part of ½ second nitrocellulose in 1.6 parts toluene, 1.1 parts of ethylene glycol monoethylether acetate, 0.7 part of isopropyl alcohol, 1.4 parts of acetone and 3.2 parts of a petroleum naphtha available commercially under the designation lactol spirits. Lactol spirits has a specific gravity of 0.725, a kauri butanol value of 36, a flash point less than 25 and a boiling temperature range of 200° F.–232° F. Into this solution 2.5 parts of finely divided graphite was dispersed by grinding the same in the solution in a steel ball mill until the dispersion was uniform.

The nitrocellulose-containing dispersion and the nitrocellulose solution were mixed and thereafter thinned with 40 parts of the solvent blend used as a diluent in Example III. Finally the Poly-Tex 611–B, Teflon 30 dispersion was blended into the resulting graphite-containing nitrocellulose lacquer and the blending was continued until the resulting dispersion was uniform. This resulted in a product having the following formulation:

| | Parts by weight |
|---|---|
| ½ second nitrocellulose | 10.8 |
| Toluene | 31.6 |
| Ethylene glycol monoethylether acetate | 1.1 |
| Isopropyl alcohol | 4.4 |
| Acetone | 1.4 |
| Lactol spirits | 3.2 |
| Butyl acetate | 49.9 |
| Ethyl acetate (85%–88%) | 33.7 |
| Butyl alcohol | 10.9 |
| Poly-Tex 611-B | 1.8 |
| Teflon 30 | 20.2 |
| Graphite | 2.5 |
| Polyvinyl butyraldehyde | 1.5 |

A plurality of 4" x 6" low carbon steel panels were sprayed with the composite dispersion in the apparatus and under the conditions specified above in Example I and the coatings permitted to dry. Upon inspection, the panels were found to be coated with an adherent film having dispersed therein polytetrafluoroethylene particles and graphite particles, and these particles were relatively uniformly distributed over the surface. The coefficient of static friction was measured and found to be an average of 0.087. The coated surfaces were tested for wear life with the Hartmann Tester and showed an average wear life of 158 minutes.

EXAMPLE XI

A plurality of Hartmann test rings were preliminarily coated with a heavy zinc phosphate coating, commercially designated Parco Lubrite No. 2 and having a coating weight of between about 1500 and 2000 mg./sq. ft. These rings were spray coated with a dispersion having a composition identical to that set up in Table I of Example III by using the apparatus and application conditions described in Example I. After curing, these rings were tested for wear life on the Hartmann Tester and found to have an average wear life of 24.9 hours.

EXAMPLE XII

A solution was prepared by dissolving 33 parts of ½ second nitrocellulose into 67 parts of a solution comprising butyl alcohol 8.4, 39 parts butyl acetate, 26.3 parts ethyl acetate, 2.9 parts isopropyl alcohol, 23.4 parts of toluene. When the resin was completely dissolved 0.5 part of Aerosol OT was added and dissolved. Into this resulting solution was blended 55 parts of Teflon 30. This dispersion was observed to have the regular and uniform character of similarly formulated dispersions containing a dispersing agent such as polyvinyl butyral, but upon agitation for 18 hours the dispersion was observed to have separated into a liquid resin phase and a Teflon agglomerated solid phase. The agitation consisted of positioning small sample bottles of the dispersion inside a 10" diameter ball mill and securing those bottles to the inner periphery thereof and rotating the ball mill at 72 r.p.m. for 18 hours.

A plurality of 4" x 6" low carbon steel panels were spray coated with the dispersion by employing the apparatus under the same conditions employed in Example I. After drying, the panels were inspected and found to be coated with an adherent coating having uniformly distributed polytetrafluoroethylene particles therein. The static coefficient of friction was measured and found to be an average of 0.158. The coatings were tested for wear life in the same manner and on the apparatus previously described in Example I and found to be an average of 145 minutes.

EXAMPLE XIII

A solution was prepared by dissolving 28.5 parts of ½ second nitrocellulose and 4.5 parts of polyvinyl butyral into 67 parts of a solution comprising 8.4 parts butyl alcohol, 39 parts butyl acetate, 26.3 parts ethyl acetate, 2.9 parts isopropyl alcohol, 23.4 parts of toluene, and when the resins were completely dissolved 2 parts of Aerosol OT was added and dissolved. Into this resulting solution was blended 55 parts of Teflon 30. The resulting dispersion is stable under conditions simulating the degree of agitation normally encountered in transportation. After being subjected to agitation for 18 hours in the apparatus, and under the conditions described in Example XII, no change in the character of the homogeneous dispersion could be detected.

For spray application of test pieces 25 parts of the resulting dispersion was diluted with 75 parts of the above described solvent blend.

A plurality of 4" x 6" low carbon steel panels were spray coated with the dispersion by employing the apparatus under the same conditions employed in Example I. After drying, the panels were inspected and found to be coated with an adherent coating having uniformly distributed polytetrafluoroethylene particles therein. The static coefficient of friction was measured and found to be an average of .096. The coatings were tested for wear life in the same manner and on the apparatus previously described in Example I and found to be an average of 160 minutes.

EXAMPLE XIV

A solution was prepared by dissolving 1.5 parts polyvinyl butyral and 10.3 parts of ½ second nitrocellulose in 7.5 parts butyl alcohol, 34.3 parts butyl acetate, 23.2 parts ethyl acetate (85%–88%), 2.6 parts isopropyl alcohol and 20.6 parts of toluene.

A dispersion was prepared by blending 1.8 parts of Poly-Tex 611-B and 20.2 parts of Teflon 30.

A second dispersion was prepared by dissolving 0.5 part of ½ second nitrocellulose in 1.6 parts toluene, 1.1 parts of ethylene glycol monoethyl ether acetate, 0.7 part of isopropyl alcohol, 1.4 parts of acetone and 3.2 parts of a petroleum naphtha available commercially under the designation lactol spirits. Into this solution 2.5 parts of finely divided molybdenum disulfide was dispersed by grinding the same in the solution in a steel ball mill until the dispersion was uniform.

The nitrocellulose-containing dispersion and the nitrocellulose solution were mixed and thereafter thinned with 40 parts of the solvent blend used as a diluent in Example III. Thereafter the Poly-Tex 611-B, Teflon 30 dispersion was blended into the resulting molybdenum disulfide-containing nitrocellulose lacquer and the blending was continued until the resulting dispersion was uniform. The uniform dispersion has the following composition:

| | Parts by weight |
|---|---|
| ½ second nitrocellulose | 10.8 |
| Toluene | 31.6 |
| Ethylene glycol monoethylether acetate | 1.1 |
| Isopropyl alcohol | 4.4 |
| Acetone | 1.4 |
| Lactol spirits | 3.2 |
| Butyl acetate | 49.9 |
| Ethyl acetate (85%–88%) | 33.7 |
| Butyl alcohol | 10.9 |
| Poly-Tex 611-B | 1.8 |
| Teflon 30 | 20.2 |
| Molybdenum disulfide | 2.5 |
| Polyvinyl butyraldehyde | 1.5 |

A plurality of 4" x 6" low carbon steel panels were sprayed with the composite dispersion in the apparatus and under the conditions specified above in Example I, and the coatings permitted to dry. The resulting panels, upon inspection, were found to be coated with an adherent film having dispersed therein discrete polytetrafluoroethylene and molybdenum disulfide particles, which particles were substantially uniformly distributed over the surface. The coefficient of static friction was measured and found to be an average of 0.087. The coated surfaces were tested for wear life on the Hartmann Tester and showed an average wear life of 190 minutes.

EXAMPLE XV

A solution was prepared by dissolving 10.3 parts of ½ second nitrocellulose and 1.5 parts of polyvinyl butyraldehyde in 7.5 parts of butyl alcohol, 34.3 parts of butyl acetate, 23.2 parts of ethyl acetate (85%–88%), 2.6 parts of isopropyl alcohol and 20.6 parts of toluene and stirring until uniform. Separate portions of this solution were modified by adding thereto Aerosol OT in the following quantities: 0.2 part, 0.5 part, 1.0 part, 1.5 parts and 2.0 parts.

An aqueous dispersion was prepared by blending together 1.8 parts of Poly-Tex 611–B and 20.2 parts of Teflon 30. 100 parts of each of the nitrocellulose solutions containing the different quantities of Aerosol OT was blended with 22 parts of the Teflon 30 dispersion, as above described and stirred until a uniform dispersion was obtained. Each of these dispersions was then admixed with 40 parts of a solvent solution containing 3.4 parts butyl alcohol, 15.6 parts of butyl acetate, 10.5 parts of ethyl acetate (85%–88%), 1.1 parts of isopropyl alcohol and 9.4 parts of toluene.

Each of these dispersions was sprayed, using the apparatus and conditions of application specified above in Example I on a plurality of 4″ x 6″ low carbon steel panels and allowed to dry at room temperature. The static coefficient of friction of the coatings on these panels was found to be substantially the same and to be an average of about 0.060. When the coatings were tested for wear life on the Hartmann Tester, in accordance with the conditions specified above in Example I, the average wear life of the coatings containing 0.2, 1.0, 1.5 and 2.0 parts of Aerosol OT were found to approximate 137 minutes and thus to be substantially comparable to the results obtained from the use of the composition of Example III. However, the coatings formed from the application of the dispersions containing 0.5 part Aerosol OT were found to have an average wear life of 273 minutes.

What is claimed is:

1. A polytetrafluoroethylene dispersion comprising polytetrafluoroethylene particles having a size in the range of about 0.1 micron to about 3 microns, at least one water insoluble celluose ester resin, and a dispersing medium consisting of water, an organic solvent for said resin consisting of a water insoluble portion and a water soluble portion, said water insoluble portion constituting at least about 15% of said dispersing medium about 5% to about 15% by weight, based on the weight of the said cellulose ester resin solids, of a stability-promoting material selected from the group consisting of polyvinyl butyral, polyvinyl formal, ethyl cellulose and ethyl hydroxyethyl cellulose, said dispersion containing less than about 35% combined polytetrafluoroethylene and resin solids, and the polytetrafluoroethylene constituting between about 10% and about 80% of said combined solids.

2. A dispersion in accordance with claim 1 in which there is present between about 0.1 and 2%, by weight of a compatible wetting agent.

3. A polytetrafluoroethylene concentrated dispersion containing a dispersing medium consisting of water, an organic solvent consisting of a water insoluble portion and a water soluble portion, and capable of dilution into a homogeneous dilute dispersion containing polytetrafluoroethylene particles having a size in the range of about 0.1 micron to about 3 microns and cellulose acetate, said concentrate containing less than about 35%, by weight, combined polytetrafluoroethylene and cellulose acetate solids, and a maximum of about 20% cellulose acetate solids up to about 15% by weight of said cellulose ester solids of a stability-promoting resin selected from the group consisting of polyvinyl butyral, polyvinyl formal, ethyl cellulose and ethyl hydroxyethyl cellulose, 0–10% by weight of said dispersion of a compatible wetting agent.

4. A polytetrafluoroethylene concentrated dispersion containing a dispersing medium consisting of water, an organic solvent consisting of a water insoluble portion and a water soluble portion, and capable of dilution into a homogeneous dilute dispersion containing polytetrafluoroethylene particles having a size in the range of about 0.1 micron to about 3 microns and cellulose acetate butyrate, said concentrate containing less than about 45%, by weight of combined polytetrafluoroethylene and cellulose acetate butyrate solids, a maximum of about 36% cellulose acetate butyrate solids and a maximum of about 36% polytetrafluoroethylene solids, up to about 15%, by weight of said cellulose ester solids, of a stability-promoting resin selected from the group consisting of polyvinyl butyral, polyvinyl formal, ethyl cellulose and ethyl hydroxyethyl cellulose and 0–10% by weight of said dispersion of a compatible wetting agent.

5. A polytetrafluoroethylene concentrated dispersion containing a dispersing medium consisting of water, an organic solvent consisting of a water insoluble portion and a water soluble portion, and capable of dilution into a homogeneous dilute dispersion containing polytetrafluoroethylene particles having a size in the range of about 0.1 micron to about 3 microns and cellulose acetate propionate, said concentrate containing less than about 30% combined polytetrafluoroethylene and cellulose acetate propionate solids, a maximum cellulose acetate propionate solids of 10% and a maximum polytetrafluoroethylene solids of 24%, up to about 15%, by weight of said cellulose ester solids, of a stability-promoting resin selected from the group consisting of polyvinyl butyral, polyvinyl formal, ethyl cellulose and ethyl hydroxyethyl cellulose and 0–10% by weight of said dispersion of a compatible wetting agent.

6. A polytetrafluoroethylene concentrated dispersion containing a dispersing medium consisting of water, an organic solvent consisting of a water insoluble portion and a water soluble portion, and capable of dilution into a homogeneous dilute dispersion containing polytetrafluoroethylene particles having a size in the range of about 0.1 micron to about 3 microns and cellulose triacetate, said concentrate containing less than about 26% by weight of combined polytetrafluoroethylene and cellulose triacetate solids, a maximum cellulose triacetate solids of 12% and a maximum polytetrafluoroethylene solids of 21%, up to about 15%, by weight of said cellulose ester solids, of a stability-promoting resin selected from the group consisting of polyvinyl butyral, polyvinyl formal, ethyl cellulose and ethyl hydroxyethyl cellulose and 0–10% by weight of said dispersion of a compatible wetting agent.

7. A polytetrafluoroethylene concentrated dispersion and a dispersing medium consisting of water, an organic solvent for said resin consisting of a water insoluble portion and a water soluble portion, said water insoluble portion constituting at least about 15% of said dispersing medium capable of dilution into a homogeneous dilute dispersion containing polytetrafluoroethylene particles having a size in the range of about 0.1 micron to about 3 microns and nitrocellulose, said concentrate containing less than about 45% total combined polytetrafluoroethylene and nitrocellulose solids, a maximum nitrocellulose solids of 30% and a maximum polytetrafluoroethylene solids of 35%, up to about 15%, by weight of said cellulose ester solids, of a stability-promoting resin selected from the group consisting of polyvinyl butyral, polyvinyl formal, ethyl cellulose and ethyl hydroxyethyl cellulose and 0–10% by weight of said dispersion of a compatible wetting agent.

8. A method of forming a polytetrafluoroethylene-containing coating on a substrate which comprises the steps of applying to the surface thereof a dispersion containing polytetrafluoroethylene particles having a size in the range of about 0.1 micron to about 3 microns, at least one water insoluble cellulose ester resin, a dispersing medium consisting of water, an organic solvent for said resin consisting of a water insoluble portion and a water soluble portion, said water insoluble portion constituting at least about 15% of said dispersing medium and 5% to 15% by weight of a stability-promoting material selected from the group consisting of polyvinyl butyral, polyvinyl formal, ethyl cellulose and ethyl hydroxyethyl cellulose, said dispersion containing less than about 35%, by weight, combined polytetrafluoroethylene and cellulose ester resin solids, the polytetrafluoroethylene particles constituting between about 10 and about 80% of said combined polytetrafluoroethylene and cellulose ester resin solids, and drying said dispersion on said substrate at ambient temperatures until the said polytetrafluoroethylene particles constitute a substantially uniformly distributed discontinuous phase in a continuous phase of said cellulose ester resin.

9. A method in accordance with claim 8 wherein said cellulose ester resin is nitrocellulose.

10. An article having on its surface an adherent protective and lubricating coating comprising a dry water insoluble cellulose ester resin having distributed therein, as a discontinuous phase, polytetrafluoroethylene particles having a size in the range of about 0.1 micron to about 3 microns and at least one other low friction pigment selected from the group consisting of graphite, molybdenum disulfide, boron nitride, talc, vermiculite, tungsten disulfide, silver sulfate and yellow lead oxide in a quantity less than the quantity of polytetrafluoroethylene which is present, said coating having a thickness in the range of about 0.01 to about 10 mils.

11. A polytetrafluoroethylene dispersion consisting essentially of polytetrafluoroethylene particles having a size in the range of about 0.1 micron to about 3 microns, at least one water insoluble cellulose ester resin and a dispersing medium, said dispersing medium consisting of water, an organic solvent for said resin consisting of a water insoluble portion and a water soluble portion, said water insoluble portion constituting at least about 15% of said dispersing medium, and at least one other low friction pigment selected from the group consisting of graphite, molybdenum disulfide, boron nitride, talc, vermiculite, tungsten disulfide, silver sulfate and yellow lead oxide, said dispersion containing less than about 35% combined polytetrafluoroethylene, resin and said other low friction pigment solids, said polytetrafluoroethylene constituting between about 10% and about 80% of said combined solids and said low friction pigment constituting between about 10% and about 30%, by weight, of said polytetrafluoroethylene.

12. A method of forming a polytetrafluoroethylene-containing coating on a substrate which comprises the steps of applying to the surface thereof a dispersion comprising polytetrafluoroethylene particles having a size in the range of about 0.1 micron to about 3 microns, at least one water insoluble cellulose ester resin and a dispersing medium, said dispersing medium consisting of water, an organic solvent for said resin consisting of a water insoluble portion and a water soluble portion, said water insoluble portion constituting at least about 15% of said dispersing medium, and at least one other low friction pigment selected from the group consisting of graphite, molybdenum disulfide, boron nitride, talc, vermiculite, tungsten disulfide, silver sulfate and yellow lead oxide, said dispersion containing less than about 35% combined polytetrafluoroethylene, resin and said other low friction pigment solids, said polytetrafluoroethylene constituting between about 10% and about 80% of said combined solids and said low friction pigment constituting between about 10% and about 30%, by weight, of said polytetrafluoroethylene, and drying said dispersion on said substrate until the said polytetrafluoroethylene particles and said low friction pigment particles constitute a discontinuous phase in a continuous phase of the said cellulose ester resin.

References Cited in the file of this patent

UNITED STATES PATENTS

| | | |
|---|---|---|
| 2,413,498 | Hill | Dec. 31, 1946 |
| 2,625,523 | Garber et al. | Jan. 13, 1953 |
| 2,700,623 | Hall | Jan. 25, 1955 |
| 2,715,617 | White | Aug. 16, 1955 |
| 2,798,017 | Lesser | July 2, 1957 |
| 2,868,741 | Chambers et al. | Jan. 13, 1959 |
| 2,976,257 | Dawe et al. | Mar. 21, 1961 |
| 3,118,846 | Boyer | Jan. 21, 1964 |